(12) United States Patent
Aravkin et al.

(10) Patent No.: US 9,785,862 B2
(45) Date of Patent: Oct. 10, 2017

(54) SYSTEM AND METHOD FOR FEELING SURFACE ROUGHNESS THROUGH MICROSCOPIC DATA

(71) Applicant: International Business Machines Corporation, Armonk, NY (US)

(72) Inventors: Aleksandr Y. Aravkin, Bronx, NY (US); Anirban Basu, Elmsford, NY (US); Dimitri Kanevsky, Ossining, NY (US); Tara N. Sainath, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/461,766

(22) Filed: Aug. 18, 2014

(65) Prior Publication Data

US 2016/0048997 A1 Feb. 18, 2016

(51) Int. Cl.
*G06K 9/00* (2006.01)
*G06K 9/62* (2006.01)
*G06F 3/01* (2006.01)
*G09B 21/00* (2006.01)
*G01B 11/30* (2006.01)

(52) U.S. Cl.
CPC ............ *G06K 9/6202* (2013.01); *G01B 11/30* (2013.01); *G06F 3/016* (2013.01); *G09B 21/00* (2013.01)

(58) Field of Classification Search
None
See application file for complete search history.

(56) References Cited

U.S. PATENT DOCUMENTS

| 7,562,816 B2 | 7/2009 | Abraham et al. |
| 7,995,196 B1* | 8/2011 | Fraser ............... G06K 9/00577 356/71 |
| 8,380,586 B2 | 2/2013 | Paolini |
| 2006/0126902 A1* | 6/2006 | Matsuda .............. G01B 11/303 382/108 |
| 2010/0100429 A1 | 4/2010 | McCloskey et al. |
| 2010/0266179 A1* | 10/2010 | Ramsay ............... G06T 7/0012 382/131 |
| 2011/0035299 A1 | 2/2011 | Casey |

(Continued)

FOREIGN PATENT DOCUMENTS

| EP | 1653478 A2 | 5/2006 |
| WO | 02/25271 A2 | 3/2002 |

OTHER PUBLICATIONS

J. Watanabe et al., "Artificial Tactile Feeling Displayed by Large Displacement MEMS Actuator Arrays," IEEE 25th International Conference on Micro Electro Mechanical Systems (MEMS), Jan. 2012, pp. 1129-1132, Paris, France.

(Continued)

*Primary Examiner* — Weiwen Yang
(74) *Attorney, Agent, or Firm* — Kurt Goudy; Ryan, Mason & Lewis, LLP

(57) ABSTRACT

Systems and methods for generating a tactile representation of an object are provided. A method for generating a tactile representation of an object, comprises obtaining a microscopic image of a surface of the object, processing data corresponding to the image to generate a roughness pattern for the object based on the image, calibrating the roughness pattern with a predetermined material, and simulating the roughness pattern on an electronic device.

20 Claims, 4 Drawing Sheets

(56) References Cited

U.S. PATENT DOCUMENTS

2012/0078700 A1    3/2012  Pugliese, III et al.
2013/0066751 A1    3/2013  Glazer et al.
2014/0118127 A1*   5/2014  Levesque ................ G06F 3/016
                                                    340/407.2

OTHER PUBLICATIONS

IBM, "Method and Apparatus for Online Shopping with in Store Pickup and Payment," ip.com, IPCOM000010644D, Jan. 2003, 5 pages.

* cited by examiner

100

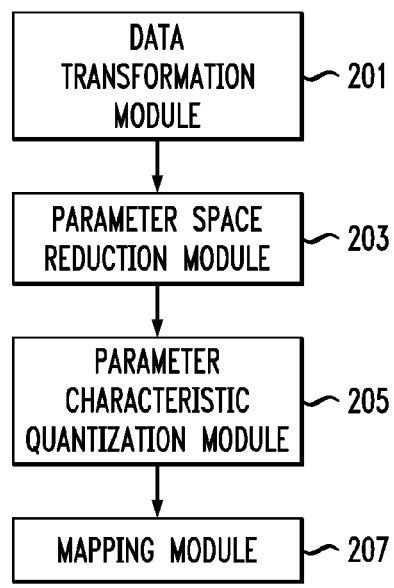
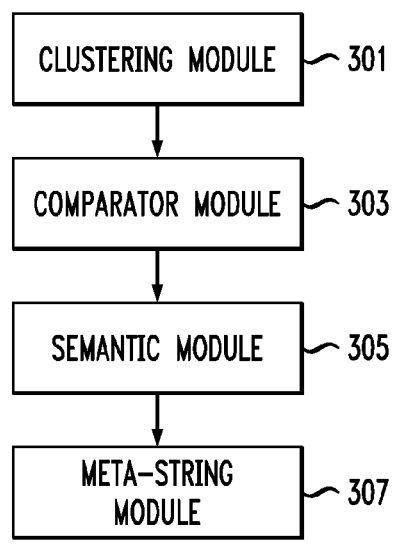

110

500

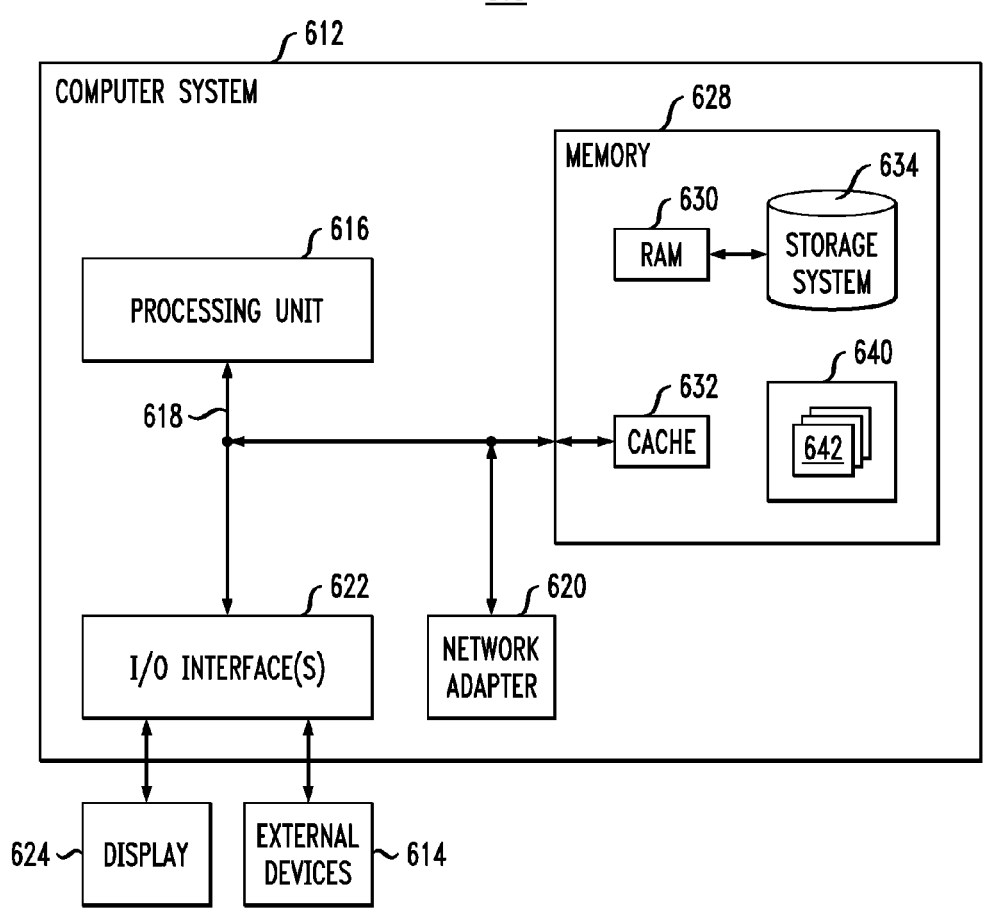

SYSTEM AND METHOD FOR FEELING SURFACE ROUGHNESS THROUGH MICROSCOPIC DATA

TECHNICAL FIELD

The field generally relates to systems and methods for generating a tactile representation of an object and, in particular, systems and methods for translating microscopic input data into a macroscopic conclusion, which is provided to a consumer in the form of a tactile representation.

BACKGROUND

With respect to, for example, online purchasing and other transactions of information, an emerging area of focus is decision-making through improved customer experience. For example, while buying clothes online, an online image provides minimal information to judge the quality of the cloth (smooth or rough, texture, etc.). In general, it is necessary to directly touch a product in order to gauge product quality and texture.

Accordingly, there is a need for methods and systems for enabling a user in an online environment to determine product qualities normally judged by direct contact with the product.

SUMMARY

In general, exemplary embodiments of the invention include systems and methods for generating a tactile representation of an object and, in particular, systems and methods for translating microscopic input data into a macroscopic conclusion, which is provided to a consumer in the form of a tactile representation.

Embodiments of the present invention generate tactile features not from visual analysis, but from surface analysis of an item. More particularly, embodiments of the present invention perform, for example, microscopic analysis of a material, which is used as an input to generate a conclusion regarding macroscopic features of the material.

According to an exemplary embodiment of the present invention, a method for generating a tactile representation of an object, comprises obtaining a microscopic image of a surface of the object, processing data corresponding to the image to generate a roughness pattern for the object based on the image, calibrating the roughness pattern with a predetermined material, and simulating the roughness pattern on an electronic device.

According to an exemplary embodiment of the present invention, a system for generating a tactile representation of an object, comprises a sensor capable of obtaining a microscopic image of a surface of the object, a transformation module capable of processing data corresponding to the image to generate a roughness pattern for the object based on the image, an interpretation module capable of calibrating the roughness pattern with a predetermined material, and a tactile production module capable of simulating the roughness pattern on an electronic device.

According to an exemplary embodiment of the present invention, a computer program product for generating a tactile representation of an object comprises a computer readable storage medium having program instructions embodied therewith, the program instructions executable by a processor to cause the processor to perform a method comprising obtaining a microscopic image of a surface of the object, processing data corresponding to the image to generate a roughness pattern for the object based on the image, calibrating the roughness pattern with a predetermined material, and simulating the roughness pattern on an electronic device.

These and other embodiments of the invention will become apparent from the following detailed description of illustrative embodiments thereof, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 2 is a block diagram of a transformation module from FIG. 1, according to an exemplary embodiment of the present invention.

FIG. 3 is a block diagram of an interpretation module from FIG. 1, according to an exemplary embodiment of the present invention.

FIG. 6 illustrates a computer system that may be used to implement one or more components/steps of the techniques of the invention, according to an exemplary embodiment of the invention.

DETAILED DESCRIPTION

Figure 1:
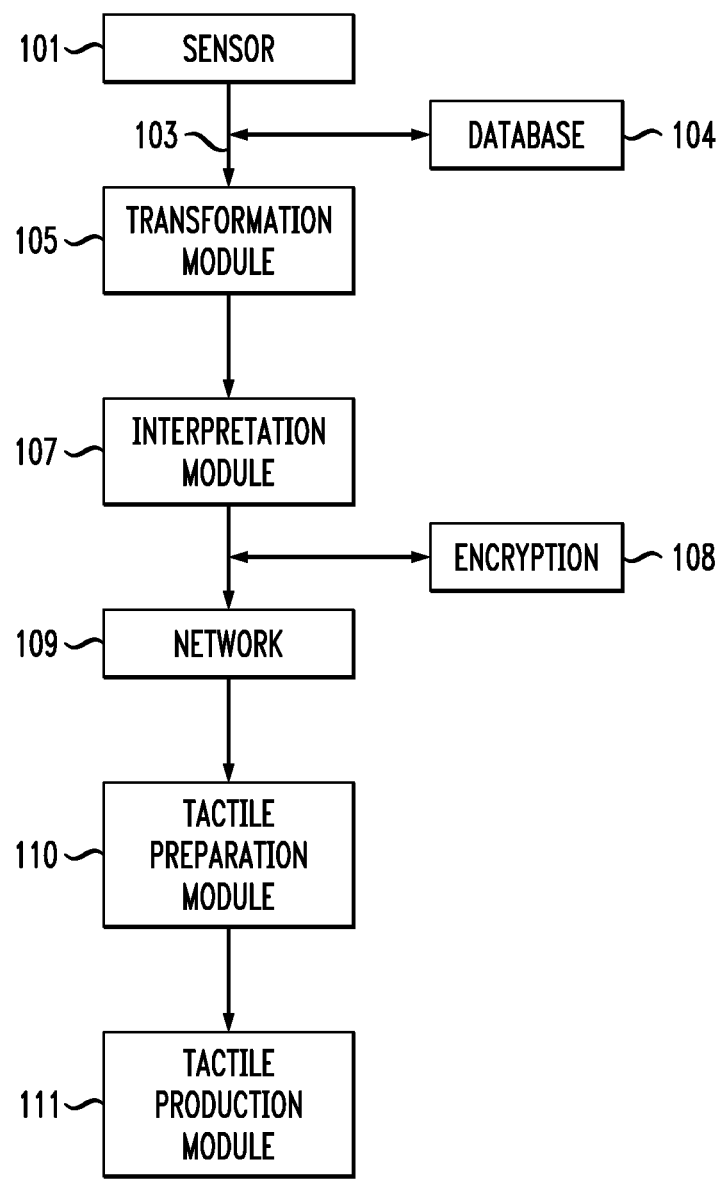
FIG. 1 is a block diagram of a system for generating a tactile representation, according to an exemplary embodiment of the present invention.

Exemplary embodiments of the invention will now be discussed in further detail with regard to systems and methods for generating a tactile representation of an object and, in particular, to systems and methods for translating microscopic input data into a macroscopic conclusion, which is provided to a consumer in the form of a tactile representation. This invention may, however, be embodied in many different forms and should not be construed as limited to the embodiments set forth herein.

The microscopic images of different materials are effective indicators of the macroscopic properties of these objects. Embodiments of the present invention draw conclusions about the macroscopic qualities of an object by analyzing microscopic images taken by one or more imaging techniques, including but not limited to, scanning electron microscopy (SEM), atomic force microscopy (AFM), surface acoustic microscopy (SAM) and scanning tunneling microscopy (STM). While embodiments of the present invention are discussed in connection with microscopic images, the embodiments are not necessarily limited thereto. For example, depending on the imaging techniques used, embodiments of the present invention may derive macroscopic properties of an object from other levels of images, including, but not limited to, nanoscopic images.

Roughness refers to a configuration of a surface of an item, for example, a coarseness or unevenness due to, for example, projections, bumps, irregularities, or breaks. A degree of roughness can be used to indicate a texture of an item.

Smoothness refers to a configuration of a surface of an item, for example, a flatness or evenness due to, for example, a lack of projections, bumps, irregularities, or breaks. A degree of smoothness can be used to indicate a texture of an item.

A tactile representation refers to a representation of an object that is perceptible by touch.

AFM refers to a process that determines a configuration of an object by moving a laser guided tip over the contour of a surface(s) of the object. According to an embodiment, the configuration of the object can be compared with that of a benchmark material to draw conclusions about the expected roughness of the object.

SEM images and data can be used to generate a contour plot of an object. According to an embodiment, troughs and crests of the contour plot can be compared with those of a benchmark material and a correlation plot can be made to draw conclusions about the expected roughness of the object.

SAM can be used on conductive/metallic surfaces, where a sound wave of particular frequency sent along a conductive/metallic surface generates a signature interference pattern depending on the surface roughness. In accordance with an embodiment, such a signature pattern can be used as a standard, which is compared with an interference pattern of a target material, and determinations are made about a roughness of the target material.

STM uses tunneling current to map the surface of an object. A change in tunnel current serves as feedback to a probe as to how much variation is present in the surface of the object. In accordance with an embodiment of the present invention, the STM data is represented as quantum effects that are mapped into a mathematical space, where the data is processed with analytical methods to create a tactile representation.

Embodiments of the present invention utilize technologically accurate methodology to obtain microscopic characteristics of any material and compare the obtained microscopic characteristics with those of standard/benchmark materials to determine their macroscopic characteristics (e.g., roughness), which can be used, for example, to provide a consumer with an enhanced shopping experience. The enhanced shopping experience may include sensing a texture of a product (e.g., an article of clothing, such as a leather jacket or dress, paintings, furniture, etc.) without actually touching the product.

In accordance with an embodiment, microscopic images of an object are analyzed with image processing software to generate a roughness pattern for the object. The roughness pattern can be calibrated with a predetermined benchmark material (e.g., silk), and encoded in a quick response (QR) code or equivalent encryption. As described further herein in connection with, for example, FIG. 2, a roughness pattern is a generated representation of the roughness or smoothness of a portion of an item. The roughness pattern maps out areas of the portion having unevenness or irregularities (or a lack thereof) and the intensity or degree of the unevenness or irregularities.

According to an embodiment of the present invention, upon scanning or interpretation of a QR code or equivalent encryption by an electronic device, such as, for example, a computer, smart phone or tablet, a user will be able to sense the roughness of an object by feeling a corresponding vibration of the electronic device, or a transformation of a phase change material (e.g., solid-solid phase change material) embedded in the electronic device. A phase-change material (PCM) refers to a material having a high heat of fusion, which is capable of storing and releasing large amounts of energy. The extent of the sensed feedback (e.g., the vibration or transformation) will be modulated by the nature of the roughness pattern generated by image processing software.

In accordance with an embodiment of the present invention, if a user is working with one electronic device, such as, for example, a personal computer, the feedback can be sent to a sensing device, such as, for example, a remote sensing device, such as a smart phone, or other sensing accessory, which can be connected or otherwise linked to the personal computer.

In accordance with an embodiment of the present invention, once a microscopic image of an object is obtained, the attributes of the microscopic image can be provided in an online retail platform. A system can compare a roughness pattern based on the microscopic image with some given standard (e.g., a roughness pattern of a predetermined material) and scan the results of the comparison through QR codes or equivalent encryptions, as explained herein.

In addition to feeling, embodiments of the present invention may enhance a user's understanding about a product by providing the user with an explanation of a comparison to a roughness of a reference/standard object (e.g., a particular cotton bed sheet is 100× more rough than standard silk). Such comparison will be accomplished by understanding the microscopic nature of the object and then comparing it with the microscopic level details of a benchmark item. In another embodiment, customers can also visually look at the microscopic image to have additional information on the roughness of an item.

Embodiments of the present invention also map atomic characteristics obtained from microscopic images to touch patterns that can be reproduced for a user as space macro characteristics via tactile sensors. In such an embodiment, the atomic level image is used to extract average roughness of an object, the roughness pattern is passed through image processing, and an amplified signal of the roughness can be produced based on calibration with known or pre-calibrated standards. This amplified signal through tactile sensors can be used to manifest physical perception in the form of perceived roughness and/or temperature, etc.

FIG. 1 shows a block diagram of a system for generating a tactile representation, in accordance with an embodiment of the present invention. The system 100 includes a sensor 101, such as a microscope, which provides microscopic data 103 taken from a scan of a surface of an object to a transformation module 105. The system 100 can further include a database 104 of microscopic data taken from scans of multiple objects (e.g., the products offered by an online retailer), and the microscopic data 103 can be input to the transformation module 105 from the database 104. The scans of the multiple objects can be performed prior to a user requesting the tactile representation, and the microscopic data can be stored in the database 104 for future use. The transformation module 105 transforms microscopic information into tactile-useful information. FIG. 2 is a block diagram of the transformation module 105, which generates the roughness pattern explained further herein (see, e.g., block 505 of FIG. 5). As can be seen in FIG. 2, the transformation module 105 includes a data transformation module 201, which transforms the microscopic input data 103 into a metadata representation. The data transformation module 201 takes the raw microscopic data output from a sensor, such as a microscope, or from the database 104, and puts the raw data into a usable form by transforming the raw data into a metadata representation. The transformation module 105 further includes a parameter space reduction module 203, which reduces the parameter space of possible tactile representations given the metadata representation. The parameter space reduction module 203 reduces the metadata into three-dimensional (3-D) matrix form to define 3-D characteristics of an object. A parameter characteristic quantization module 205 digitizes the data from the parameter space reduction module 203 to produce a set of quantized features. For example, when producing the roughness pattern, in a simplified example, some areas of a roughness pattern may be considered smooth and given a "0" value, while other areas are deemed rough, and given a "1" value. The transformation module 105 further includes a mapping module 207, which maps the quantized features from the parameter characteristic quantization module 205 into an intensity representation. For example, the mapping module 207 presents the quantized features in some predetermined scheme, such as, rough areas are dark, while smooth areas are light.

The system 100 further includes an interpretation module 107, which interprets various qualities about an object that are useful for tactile representation of the object. FIG. 3 is a block diagram of the interpretation module 107, which performs the calibration explained further herein (see, e.g., block 507 of FIG. 5). As can be seen in FIG. 3, the interpretation module 107 includes a clustering module 301, which organizes the data from the transformation module 105, into, for example, clusters, or some other appropriate organizational scheme. The comparator module 303 compares the organized (e.g., clustered) data to one or more standard prototypes (e.g., the standard/benchmark roughness pattern of silk and/or cotton). Using one or more algorithms, the semantic module 305 maps labels to a semantic meaning so as to understand differences between the roughness pattern generated by the transformation module 105 and the benchmark/standard roughness pattern(s). For example, the resulting data from the semantic module 305 may indicate which areas of the roughness pattern are smoother or rougher than, or similar to the standard roughness pattern. The meta-string module 307 takes the semantic meanings, which include mapped results of the comparison, and produces meta-strings of the semantic meanings. The meta-strings can be processed and encrypted into QR code or some other equivalent by an encryption module 108 (see, e.g., block 509 in FIG. 5).

Figure 4:
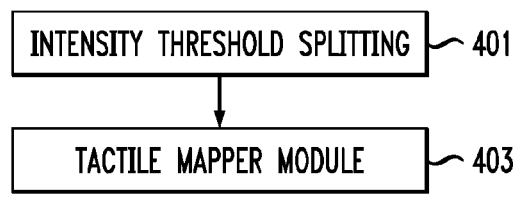
FIG. 4 is a block diagram of a tactile preparation module from FIG. 1, according to an exemplary embodiment of the present invention.

The system 100 also includes a tactile preparation module 110, which prepares data for a tactile representation from the given input features. FIG. 4 is a block diagram of the tactile preparation module 110. As can be seen in FIG. 4, the tactile preparation module 110 includes an intensity threshold splitting module 401, and a tactile mapper module 403. The intensity threshold splitting module 401 receives the meta-string data from the meta-string module 307, or decrypted meta-string data after reading or scanning encrypted meta-string data (e.g., after scanning a QR code) from encryption module 108. The meta-string data defines a roughness map, and the intensity threshold splitting module 401 takes the levels of roughness from the roughness map and splits them into different portions based on the amount or intensity of the roughness. The tactile mapper module 403 produces a tactile map of each intensity zone to one or more distinct tactile spatial signals, so that there is different tactile feedback depending on the zone and its roughness intensity. In accordance with an embodiment, the resulting tactile feedback can be an average of the tactile feedback of each zone.

Referring back to FIG. 1, the meta-string data from the meta-string module 307, or encrypted meta-string data from encryption module 108 can be sent via a network 109, such as, for example, a local area network (LAN), wide area network (WAN), cellular network, satellite network or the Internet, to an online platform for further processing by the tactile preparation module 110. A tactile production module 111 produces a tactile representation of the input data 101. The tactile production module 111 includes, for example, a transducer and/or other electrical-to-physical components, which convert the spatial signals into a physical tactile experience, such as, for example, a vibration, temperature change, and/or phase change. Data from the tactile preparation module 110 can be transmitted to the tactile production module 111 via a network, such as network 109. In accordance with an embodiment, the tactile production module 111 is incorporated into a portable electronic device, such as, for example, a smart phone or tablet.

In brief, the system 100 translates the microscopic input data 101 into an enhanced macroscopic conclusion, which is provided to a consumer in the form of a tactile representation, thereby helping the consumer making a better decision about whether to purchase a product.

Figure 5:
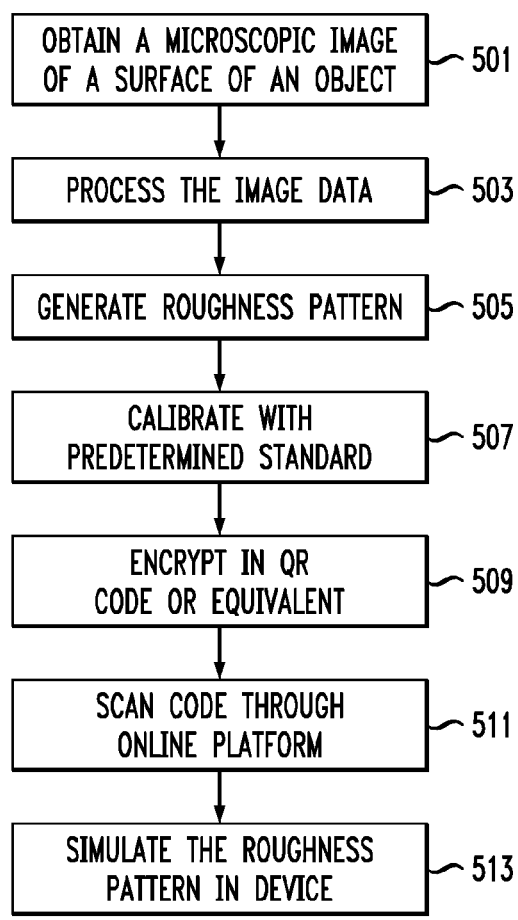
FIG. 5 illustrates a flow diagram of a method for generating a tactile representation, according to an exemplary embodiment of the present invention.

FIG. 5 is a flow diagram of a method for generating a tactile representation, in accordance with an exemplary embodiment of the present invention. The method 500 includes obtaining a microscopic image of a surface of an object (block 501), and processing data corresponding to the image (block 503), using, for example, image processing software to generate a roughness pattern based on the microscopic image (block 505). The microscopic image can be obtained using, for example, one of the AFM, SEM, SAM, or STM techniques described above. The images can be physically gathered at earlier dates by scanning the products (e.g., the products to be sold by the retailer) and stored in a database 104 of microscopic images.

At block 507, the roughness pattern of the object is calibrated with a predetermined standard material, such as, for example, silk or cotton. For the calibration, a similar microscopic roughness pattern of the benchmark material is compared to the microscopic roughness pattern of the object to determine roughness of the object with respect to a roughness of the standard/benchmark material (e.g., the object is 10 times rougher or smoother than the standard/benchmark material). The result of the calibration is encrypted in QR code or an equivalent (block 509). The code is scanned through an online platform, for example, an online retail platform (block 511). The code is read by an electronic device, for example, a smart phone or tablet, and the roughness pattern is simulated in the device, through, for example, vibration, temperature variation (e.g., heat generation), light intensity variation, and/or surface roughness change using phase change materials (block 513). In accordance with an embodiment of the present invention, information can be provided to a user that the product is a certain value (e.g., 10 times) rougher or smoother than a benchmark material, such as silk or cotton.

It is to be understood that while the embodiments of the present invention have been discussed in connection with online commerce scenarios, the embodiments are not necessarily limited thereto, and may be applicable, for example, in non-commerce situations, such as, social, emergency or medical situations, where a tactile representation of an item, person or animal may be generated. In such situations, generation of the tactile representation may be based on a microscopic input as discussed herein, or a macroscopic input.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a tactile representation of an object, comprising:
   obtaining a microscopic image of a surface of the object;
   processing data corresponding to the image to generate a roughness pattern for the object based on the image;
   wherein the data comprises microscopic data;
   wherein the processing comprises:
      transforming the microscopic data into a metadata representation; and
      reducing a parameter space of possible tactile representations given the metadata representation by generating a three-dimensional (3-D) matrix from the metadata representation;
   calibrating the roughness pattern with a predetermined material;
   wherein the calibrating comprises:
      comparing a benchmark roughness pattern for the predetermined material with the roughness pattern for the object; and
      mapping differences between the benchmark roughness pattern for the predetermined material and the roughness pattern for the object to identify areas of the roughness pattern for the object which are one of smoother and rougher than the benchmark roughness pattern;
   simulating the roughness pattern on an electronic device; and
   outputting a value representing a degree of difference of at least one of a smoothness and a roughness of the object from at least one of a smoothness and a roughness, respectively, of the predetermined material,
   wherein the obtaining, processing, calibrating, simulating and outputting steps are performed by a computer system comprising a memory and at least one processor coupled to the memory.

2. The method according to claim 1, wherein the processing further comprises:
digitizing a result of the reducing of the parameter space to produce a set of quantized features; and
mapping the quantized features into an intensity representation.

3. The method according to claim 1, further comprising:
defining a roughness map from the mapped differences; and
dividing levels of roughness from the roughness map into different portions based on roughness intensity.

4. The method according to claim 3, further comprising producing a map of each of the different portions to one or more distinct tactile spatial signals.

5. The method according to claim 1, wherein the calibrating comprises determining the roughness of the object with respect to the roughness of the predetermined material.

6. The method according to claim 1, further comprising encrypting a result of the calibration in an encryption code, and scanning the encryption code through an online platform.

7. The method according to claim 1, wherein the simulation is performed through at least one of vibration, temperature variation, light intensity variation, and a phase change.

8. A system for generating a tactile representation of an object, comprising:
a memory;
at least one processor operatively connected to the memory;
a sensor that obtains a microscopic image of a surface of the object;
a transformation module, executed via the at least one processor, that processes data corresponding to the image to generate a roughness pattern for the object based on the image;
wherein the data comprises microscopic data;
wherein the processing comprises:
transforming the microscopic data into a metadata representation; and
reducing a parameter space of possible tactile representations given the metadata representation by generating a three-dimensional (3-D) matrix from the metadata representation;
an interpretation module, executed via the at least one processor, that calibrates the roughness pattern with a predetermined material;
wherein the calibrating comprises:
comparing a benchmark roughness pattern for the predetermined material with the roughness pattern for the object; and
mapping differences between the benchmark roughness pattern for the predetermined material and the roughness pattern for the object to identify areas of the roughness pattern for the object which are one of smoother and rougher than the benchmark roughness pattern; and
a tactile production module, executed via the at least one processor, that simulates the roughness pattern on an electronic device;
wherein a value representing a degree of difference of at least one of a smoothness and a roughness of the object from at least one of a smoothness and a roughness, respectively, of the predetermined material is outputted.

9. The system according to claim 8, wherein the transformation module:
digitizes a result of the reducing of the parameter space to produce a set of quantized features; and
maps the quantized features into an intensity representation.

10. The system according to claim 8, wherein:
the interpretation module defines a roughness map from the mapped differences; and
the system further comprises a tactile preparation module, executed via the at least one processor, that divides levels of roughness from the roughness map into different portions based on roughness intensity.

11. The system according to claim 10, wherein the tactile preparation module produces a map of each of the different portions to one or more distinct tactile spatial signals.

12. The system according to claim 8, wherein the interpretation module determines the roughness of the object with respect to the roughness of the predetermined material.

13. The system according to claim 8, further comprising an encryption module, executed via the at least one processor, that encrypts a result of the calibration in an encryption code.

14. A computer program product for generating a tactile representation of an object, the computer program product comprising a computer readable storage medium having program instructions embodied therewith, the program instructions executable by a processor to cause the processor to perform a method comprising:
obtaining a microscopic image of a surface of the object;
processing data corresponding to the image to generate a roughness pattern for the object based on the image;
wherein the data comprises microscopic data;
wherein the processing comprises:
transforming the microscopic data into a metadata representation; and
reducing a parameter space of possible tactile representations given the metadata representation by generating a three-dimensional (3-D) matrix from the metadata representation;
calibrating the roughness pattern with a predetermined material;
wherein the calibrating comprises:
comparing a benchmark roughness pattern for the predetermined material with the roughness pattern for the object; and
mapping differences between the benchmark roughness pattern for the predetermined material and the roughness pattern for the object to identify areas of the roughness pattern for the object which are one of smoother and rougher than the benchmark roughness pattern;
simulating the roughness pattern on an electronic device; and
outputting a value representing a degree of difference of at least one of a smoothness and a roughness of the object from at least one of a smoothness and a roughness, respectively, of the predetermined material.

15. The method according to claim 4, wherein the simulating comprises generating different tactile feedback for each of the different portions based on the one or more distinct tactile spatial signals.

16. The system according to claim 11, wherein the simulating comprises generating different tactile feedback for each of the different portions based on the one or more distinct tactile spatial signals.

17. The computer program product according to claim 14, wherein the processing further comprises:

digitizing a result of the reducing of the parameter space to produce a set of quantized features; and mapping the quantized features into an intensity representation.

18. The computer program product according to claim 14, wherein the method further comprises:

defining a roughness map from the mapped differences; and dividing levels of roughness from the roughness map into different portions based on roughness intensity.

19. The computer program product according to claim 18, wherein the method further comprises producing a map of each of the different portions to one or more distinct tactile spatial signals.

20. The computer program product according to claim 19, wherein the simulating comprises generating different tactile feedback for each of the different portions based on the one or more distinct tactile spatial signals.

* * * * *